US012574541B2

(12) United States Patent     (10) Patent No.:   US 12,574,541 B2

Wang et al.     (45) Date of Patent:    Mar. 10, 2026

(54) IMAGE PROCESSING METHOD AND ASSOCIATED IMAGE PROCESSING CIRCUIT

(71) Applicant: Realtek Semiconductor Corp., HsinChu (TW)

(72) Inventors: Yanting Wang, Suzhou (CN); Fangqi Xiong, Suzhou (CN); Guangyu San, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 331 days.

(21) Appl. No.: 18/227,968

(22) Filed: Jul. 30, 2023

(65) Prior Publication Data

US 2024/0236357 A1     Jul. 11, 2024

(30) Foreign Application Priority Data

Jan. 10, 2023    (CN) ......................... 202310034488.9

(51) Int. Cl.
    *H04N 19/513*     (2014.01)
    *H04N 19/176*     (2014.01)
    *H04N 19/59*     (2014.01)

(52) U.S. Cl.
    CPC ......... *H04N 19/513* (2014.11); *H04N 19/176* (2014.11); *H04N 19/59* (2014.11)

(58) Field of Classification Search
    CPC ...... H04N 19/59; H04N 19/61; H04N 19/176; H04N 19/597; H04N 19/51; H04N 19/105; H04N 19/147
    See application file for complete search history.

(56) References Cited

U.S. PATENT DOCUMENTS

| | | | | |
|---|---|---|---|---|
| 11,636,573 B2 * | 4/2023 | Yu | ............................ | G06T 7/238 |
| | | | | 382/232 |
| 2010/0316126 A1 * | 12/2010 | Chen | ....................... | H04N 19/57 |
| | | | | 375/E7.123 |
| 2011/0150091 A1 * | 6/2011 | Young | .................... | H04N 19/56 |
| | | | | 375/E7.123 |
| 2013/0003847 A1 * | 1/2013 | Hong | ..................... | H04N 19/61 |
| | | | | 375/E7.125 |
| 2013/0148732 A1 * | 6/2013 | Tanner | .................. | H04N 19/53 |
| | | | | 375/E7.125 |
| 2013/0301725 A1 * | 11/2013 | Wang | .................... | H04N 19/176 |
| | | | | 375/240.16 |
| 2016/0007038 A1 * | 1/2016 | Chou | .................... | H04N 19/182 |
| | | | | 375/240.03 |

(Continued)

FOREIGN PATENT DOCUMENTS

| | | |
|---|---|---|
| TW | 202123701 A | 6/2021 |

*Primary Examiner* — Daniel Chang

(74) *Attorney, Agent, or Firm* — Winston Hsu

(57) ABSTRACT

An image processing method includes the steps of: receiving an image signal, wherein the image signal comprises a frame; performing a motion estimation operation on a plurality of blocks within the frame to generate a plurality of first motion vectors, respectively; scaling down the frame to generate a scaled-down frame; performing the motion estimation operation on a specific block within the scaled-down frame to generate a second motion vector corresponding to the specific block; and determining a plurality of final motion vectors of the plurality of blocks of the frame according to the plurality of first motion vectors and the second motion vector.

8 Claims, 4 Drawing Sheets

(56) References Cited

U.S. PATENT DOCUMENTS

| | | | | |
|---|---|---|---|---|
| 2017/0111652 A1* | 4/2017 | Davies | ................. | H04N 19/189 |
| 2021/0327022 A1* | 10/2021 | Yu | ......................... | H04N 19/176 |
| 2024/0236357 A1* | 7/2024 | Wang | ................... | H04N 19/132 |
| 2025/0166212 A1* | 5/2025 | Yu | ............................. | G06T 5/73 |

* cited by examiner

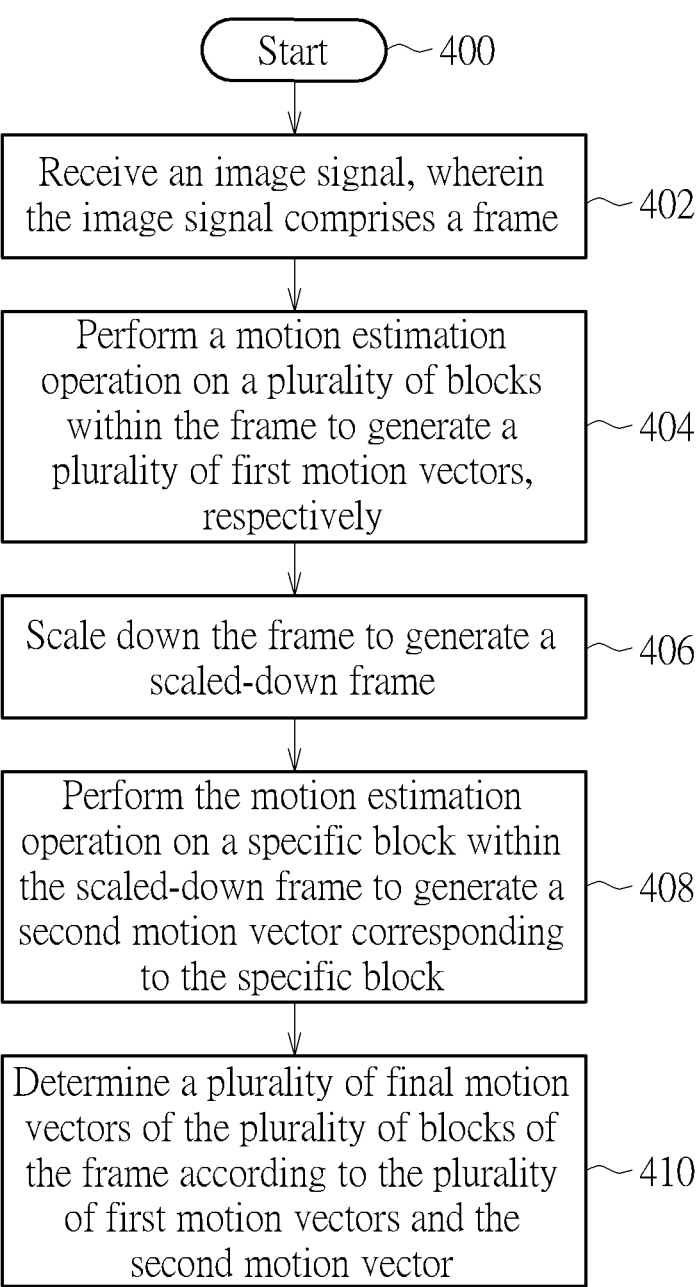

Start ~400

Receive an image signal, wherein the image signal comprises a frame ~402

Perform a motion estimation operation on a plurality of blocks within the frame to generate a plurality of first motion vectors, respectively ~404

Scale down the frame to generate a scaled-down frame ~406

Perform the motion estimation operation on a specific block within the scaled-down frame to generate a second motion vector corresponding to the specific block ~408

Determine a plurality of final motion vectors of the plurality of blocks of the frame according to the plurality of first motion vectors and the second motion vector ~410

Fig. 4

IMAGE PROCESSING METHOD AND ASSOCIATED IMAGE PROCESSING CIRCUIT

BACKGROUND OF THE INVENTION

1. Field of the Invention

The present invention relates to a signal processing method.

2. Description of the Prior Art

In order to increase a frame rate of images to achieve a better display effect, an interpolation method is used to generate an interpolated frame between two frames, and a motion estimate and motion compensation (MEMC) mechanism is used to generate a motion vector of the interpolated frame and related image content. The current motion estimation method is to divide the image frame into multiple blocks, determine the motion vector of each block, and use the motion vectors of these blocks to perform the motion compensation to determine motion vectors for interpolated frames and associated image content.

In multiple consecutive frames, multiple blocks within the same object with the same moving speed will theoretically have the same motion vector. However, since a blocks of a frame corresponds to a limited number of candidate blocks that can be selected in the reference frame, and the image content of the frame will also affect the calculation of the motion vector, different motion vectors may be calculated for the multiple blocks in the same object with the same moving speed, thus affecting the effect of subsequent motion compensation.

SUMMARY OF THE INVENTION

It is therefore an objective of the present invention to provide an image processing method, which can make multiple blocks in the same object with the same moving speed to have similar or consistent motion vectors, to solve the problems described in the prior art.

According to one embodiment of the present invention, an image processing method comprises the steps of: receiving an image signal, wherein the image signal comprises a frame; performing a motion estimation operation on a plurality of blocks within the frame to generate a plurality of first motion vectors, respectively; scaling down the frame to generate a scaled-down frame; performing the motion estimation operation on a specific block within the scaled-down frame to generate a second motion vector corresponding to the specific block; and determining a plurality of final motion vectors of the plurality of blocks of the frame according to the plurality of first motion vectors and the second motion vector.

According to one embodiment of the present invention, an image processing circuit comprising a receiving circuit, a scaling circuit, a motion estimation circuit and a motion vector generation circuit is disclosed. The receiving circuit is configured to receive an image signal, wherein the image signal comprises a frame. The scaling circuit is configured to scale down the frame to generate a scaled-down frame. The motion estimation circuit is configured to perform a motion estimation operation on a plurality of blocks within the frame to generate a first motion vectors, respectively, and perform the motion estimation operation on a specific block within the scaled-down frame to generate a second motion vector corresponding to the specific block. The motion vector generation circuit is configured to determine a plurality of final motion vectors of the plurality of blocks of the frame according to the plurality of first motion vectors and the second motion vector.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a flowchart of an image processing method according to one embodiment of the present invention.

DETAILED DESCRIPTION

Figure 1:
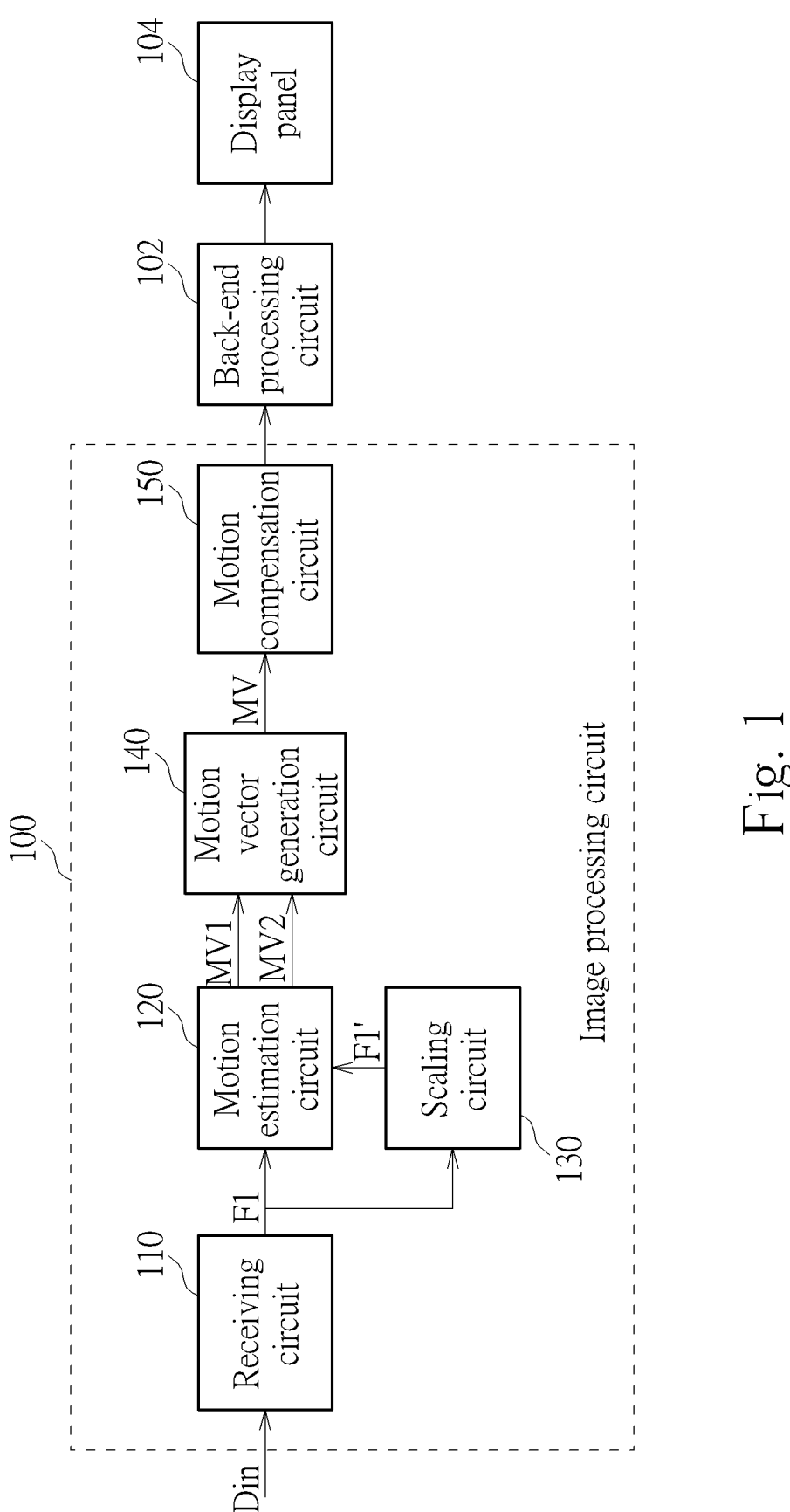
FIG. 1 is a diagram illustrating an image processing circuit according to one embodiment of the present invention.

FIG. 1 is a diagram illustrating an image processing circuit 100 according to one embodiment of the present invention. As shown in FIG. 1, the image processing circuit 100 comprises a receiving circuit 110, a motion estimation circuit 120, a scaling circuit 130, a motion vector generation circuit 140 and a motion compensation circuit 150. In this embodiment, the image processing circuit 100 comprises an operation of increasing the frame rate, that is, the image processing circuit 100 receives an image signal Din, and generates multiple interpolated frames according to multiple frames of the image signal Din, wherein the multiple frames and the multiple interpolated frames are processed by a back-end processing circuit 102 and sent to a display panel 104 for display.

Figure 2:
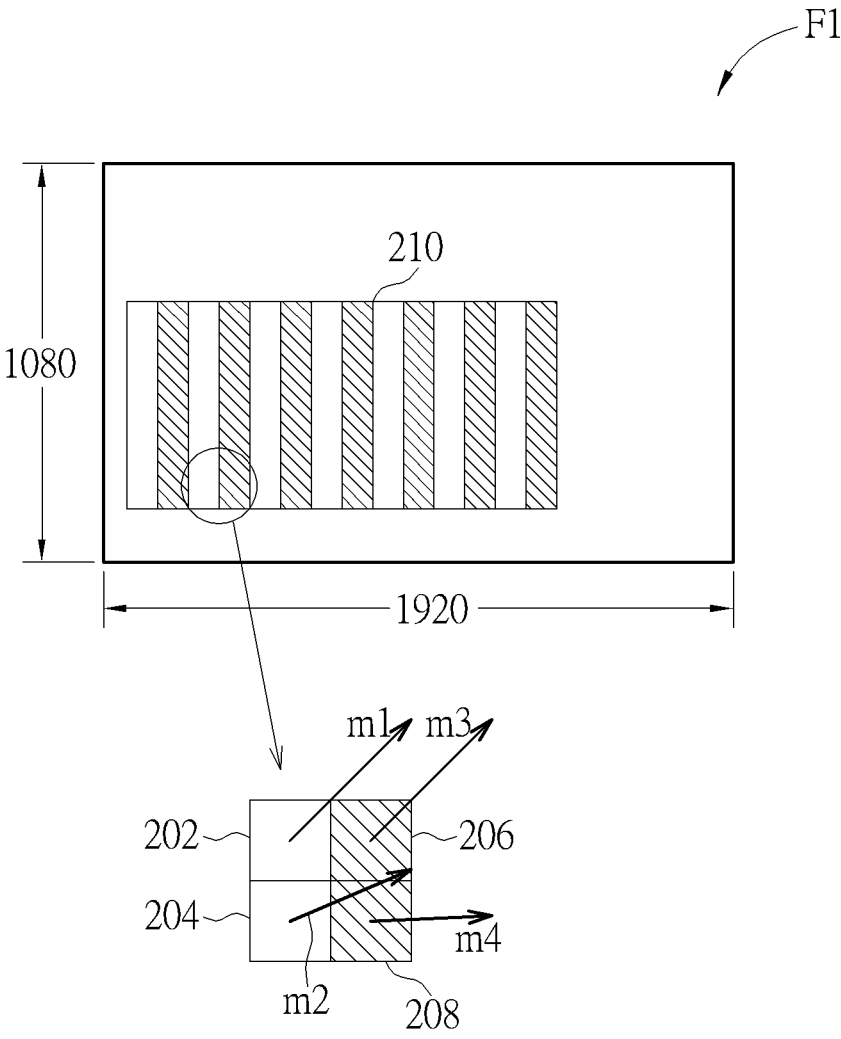
FIG. 2 is a diagram illustrating multiple blocks within a frame and their motion vectors according to one embodiment of the present invention.

Regarding the operation of the image processing circuit 100, the receiving circuit 110 receives the image signal Din, wherein the image signal Din comprises multiple frames. For the convenience of subsequent description, a frame F1 among the multiple frames will be described below. The motion estimation circuit 120 receives the multiple frames, and calculates the motion vectors of multiple blocks in each frame. Referring to FIG. 2, assuming that a resolution of the frame F1 is 1920*1080, the motion estimation circuit 120 can divide the frame F1 into multiple blocks, wherein a size of each block can be determined according to the designer's consideration, for example, the size of each block is 4*4 pixels, and at this time the frame F1 comprises 480*270 blocks. Then, the motion estimation circuit 120 determines the motion vector of each block in the frame F1 according to the content of a reference frame, wherein the reference frame can be a frame located before or after the frame F1. Taking FIG. 2 as an example, the motion estimation circuit 120 determines matching blocks in the reference frame corresponding to four adjacent blocks 202, 204, 206 and 208, respectively (for example, the matching block is a block with the smallest difference in image content from the corresponding block) to obtain an offset vector (i.e., motion vector) of each of the blocks 202, 204, 206 and 208 in the frame F1 relative to the corresponding matching block in the reference frame, such as m1, m2, m3 and m4 shown in FIG.

2. It is noted that since the calculation method of the motion vector is well known to a person skilled in the art, and the focus of the present invention is not to determine the motion vector of each block, the detailed calculations of the motion vectors in the motion estimation circuit 120 are omitted here.

Figure 3:
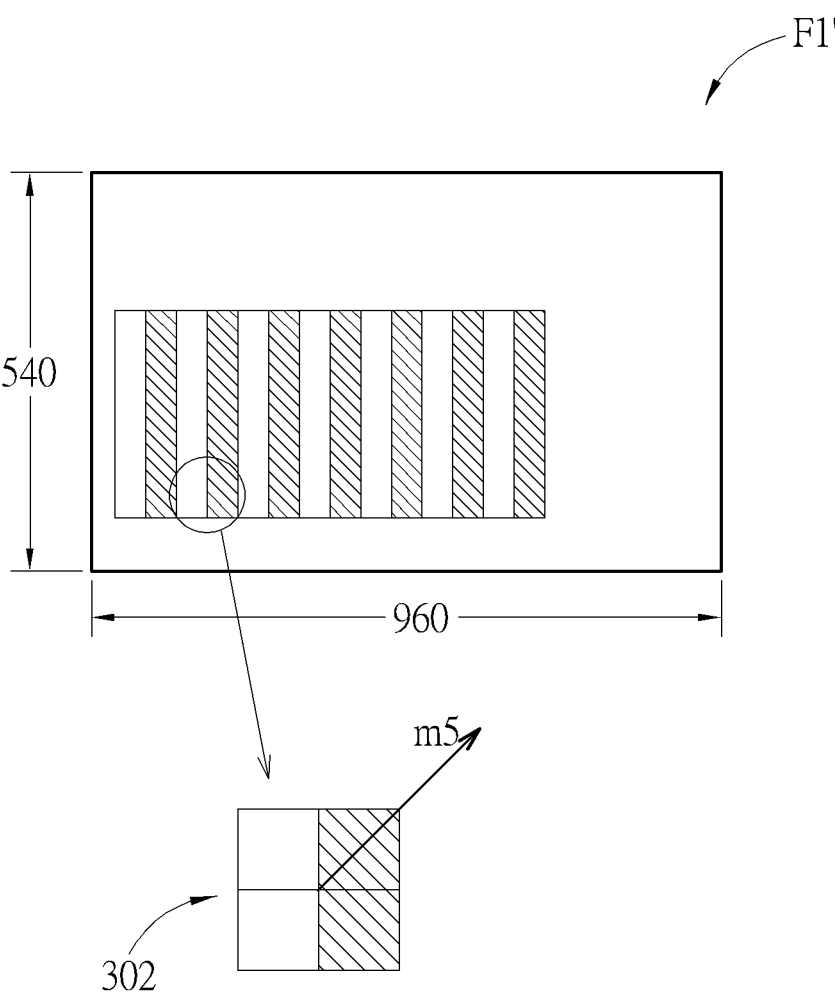
FIG. 3 is a diagram illustrating multiple blocks within a scaled-down frame and their motion vectors according to one embodiment of the present invention.

Referring to FIG. 2, assuming that the frame F1 comprises an object 210 moving to the upper right, the motion vectors m1, m2, m3, and m4 should be the same or very similar. However, if the object 210 has some special patterns, such as stripe patterns, the motion vectors m1, m2, m3 and m4 of the blocks 202, 204, 206 and 208 may have large differences in calculation, and then cause problems in following processing. Therefore, this embodiment provides the scaling circuit 130 to perform a scaling operation on the frame F1 to generate a scaled-down frame F1', and the motion estimation circuit 120 further determines motion vectors for each block in the scaled-down frame F1'. Specifically, referring to FIG. 3, the scaling circuit 130 can lower the resolution of the frame F1 by a ratio, for example, both the vertical direction and the horizontal direction can be reduced to half the resolution, so that the resolution of the scaled-down frame F1' is 960*540. Then, the motion estimation circuit 120 determines the motion vector of each block in the scaled-down frame F1' according to the content of a scaled-down reference frame, where the scaled-down reference frame can be obtained by scaling down the reference frame used for the calculations of the motion vectors of the blocks within the frame F1. Taking FIG. 3 as an example, the motion estimation circuit may search for a matching block in the scaled-down reference frame for the block 302 within the scaled down frame F1', so as to obtain the offset vector (i.e. motion vector) of the block 302 in the scaled-down frame F1' relative to the matching block in the scaled-down reference frame, such as m5 shown in FIG. 3.

Then, the motion estimation circuit 120 enlarges the motion vector m5 of the block 302 to correspond to the resolution of the frame F1. For example, assuming that the scaling circuit 130 reduces both the vertical direction and the horizontal direction of the frame F1 to half the resolution to generate the scaled-down frame F1', then the motion estimation circuit 120 doubles both the vertical direction and the horizontal direction of the motion vector m5 of the block 302 to generate an adjusted motion vector m5'.

In this embodiment, the size of the block 302 of the scaled-down frame F1' is the same as the size of each of the blocks 202, 204, 206 and 208 in the frame F1, that is, the size of the scaled-down frame F1 and the size of each of the blocks 202, 204, 206 and 208 in the frame F1 can be 4*4 pixels. In addition, the block 302 of the scaled-down frame F1' is generated by performing the scaling operation on the four blocks 202, 204, 206 and 208 in the frame F1, that is, the relative position of the block 302 in the scaled-down frame F1' is the same as the relative position of the blocks 202, 204, 206 and 208 in the frame F1'.

Then, the motion vector generation circuit 140 receives the motion vectors MV1 of the blocks in the frame F1 generated by the motion estimation circuit 120 and the motion vectors of the blocks in the scaled-down frame F1' to generate final motion vectors MV of the blocks in the frame F1, wherein MV1 can represent the motion vectors m1-m4 of the blocks 202, 204, 206 and 208 of the frame F1, and MV2 can represent the adjusted motion vector m5' of the block 302 in the scaled-down frame F1'. Specifically, the motion vector generation circuit 140 can determine to use the original motion vectors m1-m4 or the adjusted motion vector m5' of the block 302 according to the image content of the blocks 202, 204, 206 and 208. For example, the motion vector generation circuit 130 can determine to use the original motion vectors m1-m4 or the adjusted motion vector m5' according to the complexity of the image content of the blocks 202, 204, 206 and 208, such as information about whether the background and the foreground are smooth, or whether the image has complex textures and sharp edges, etc. The complexity of the image content can be obtained by calculating a variance of pixels in the block, but the present invention is not limited thereto.

In one embodiment, if the complexity of the image content in each of the blocks 202, 204, 206 and 208 is lower than a threshold value (for example, the variance of the pixels in each of the blocks 202, 204, 206 and 208 is lower than the threshold value), or the image content of the blocks 202, 204, 206, 208 can be determined to have smooth background and foreground, the motion vector generating circuit 130 preferentially generates the motion vectors of the blocks 202, 204, 206 and 208 of the frame F1 according to the motion vector MV2. For example, the original motion vectors m1-m4 of the blocks 202, 204, 206 and 208 can be discarded, and the adjusted motion vector m5' of the block 302 is used as all the motion vectors of the blocks 202, 204, 206 and 208. In another example, the motion vector generation circuit 130 performs a weighted summation on the motion vector m1 and the adjusted motion vector m5' to generate the final motion vector of the block 202, and performs the weighted summation on the motion vector m2 and the adjusted motion vector m5' to generate the final motion vector of the block 204, and so on, wherein the weight corresponding to the adjusted motion vector m5' is greater than the weight corresponding to the motion vector m1-m4.

In one embodiment, if the complexity of the image content in any one of the blocks 202, 204, 206 and 208 is greater than a threshold value (for example, the variance of the pixels in each of the blocks 202, 204, 206 and 208 is greater than the threshold value), or the image content of any one of the blocks 202, 204, 206 and 208 can be determined to have complex textures and sharp edges, the motion vector generation circuit 130 preferentially generates the motion vectors of the blocks 202, 204, 206 and 208 of the frame F1 according to the motion vector MV1. For example, the original motion vectors m1-m4 can be used as the final motion vectors of the blocks 202, 204, 206 and 208, and the adjusted motion vector m5' of the block 302 is not considered (e.g., the adjusted motion vector m5' can be discarded). In another example, the motion vector generation circuit 130 performs a weighted summation on the motion vector m1 and the adjusted motion vector m5' to generate the final motion vector of the block 202, and performs the weighted summation on the motion vector m2 and the adjusted motion vector m5' to generate the final motion vector of the block 204, and so on, wherein the weight corresponding to the adjusted motion vector m5' is lower than the weight corresponding to the motion vector m1-m4.

Then, the motion compensation circuit 150 determines the moving speed of each block according to the contents of the multiple frames of the image data Din and the motion vectors of the multiple blocks of each frame generated by the motion vector generation circuit 140, and performs motion compensation to generate the interpolated frame and related information (e.g., which block of the adjacent frame moves to the block of the interpolated frame). Since the operations of the motion compensation and generation of interpolated frames are well known to a person skilled in the art, and the focus of the present invention is not on the generation of the interpolated frames, detailed operations of the interpolated frames are omitted here.

Briefly summarized, the image processing circuit 100 of this embodiment calculates the motion vector of each block in the frame F1 and the motion vector of each block in the scaled-down frame F1', for determining the final motion vector of each block in the frame F1. Therefore, the final motion vector of each block in the frame F1 can accurately reflect the real moving direction of the object in the frame F1, so that the subsequent motion compensation circuit 150 can generate better output image data.

FIG. 4 is a flowchart of an image processing method according to one embodiment of the present invention. Referring to FIG. 1-FIG. 4 and above descriptions, the flow is described as follows.

Step 400: the flow starts.

Step 402: receive an image signal, wherein the image signal comprises a frame.

Step 404: perform a motion estimation operation on a plurality of blocks within the frame to generate a plurality of first motion vectors, respectively.

Step 406: scale down the frame to generate a scaled-down frame.

Step 408: perform the motion estimation operation on a specific block within the scaled-down frame to generate a second motion vector corresponding to the specific block.

Step 410: determine a plurality of final motion vectors of the plurality of blocks of the frame according to the plurality of first motion vectors and the second motion vector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
receiving an image signal, wherein the image signal comprises a frame;
performing a motion estimation operation on a plurality of blocks within the frame to generate a plurality of first motion vectors, respectively;
scaling down the frame to generate a scaled-down frame;
performing the motion estimation operation on a specific block within the scaled-down frame to generate a second motion vector corresponding to the specific block; and
determining a plurality of final motion vectors of the plurality of blocks of the frame according to the plurality of first motion vectors and the second motion vector;
wherein the step of determining the plurality of final motion vectors of the plurality of blocks of the frame according to the plurality of first motion vectors and the second motion vector comprises:
when a complexity of image contents of the plurality of blocks of the frame is lower than a threshold value, directly using the second motion vector as the plurality of final motion vectors of the plurality of blocks of the frame, or performing a weighted summation on the second motion vector and each of the plurality of first motion vectors, to generate the plurality of final motion vectors of the plurality of blocks of the frame.

2. The image processing method of claim 1, wherein each of the plurality of blocks has the same size as the specific block, and a relative position of the specific block in the scaled-down frame is the same as a relative position of the plurality of blocks in the frame.

3. The image processing method of claim 1, wherein the step of performing the motion estimation operation on the specific block within the scaled-down frame to generate the second motion vector corresponding to the specific block comprises:
performing the motion estimation operation on the specific block within the scaled-down frame to generate a motion vector; and
enlarging the motion vector to generate the second motion vector.

4. An image processing method, comprising:
receiving an image signal, wherein the image signal comprises a frame;
performing a motion estimation operation on a plurality of blocks within the frame to generate a plurality of first motion vectors, respectively;
scaling down the frame to generate a scaled-down frame;
performing the motion estimation operation on a specific block within the scaled-down frame to generate a second motion vector corresponding to the specific block; and
determining a plurality of final motion vectors of the plurality of blocks of the frame according to the plurality of first motion vectors and the second motion vector;
wherein the step of determining the plurality of final motion vectors of the plurality of blocks of the frame according to the plurality of first motion vectors and the second motion vector comprises:
when a complexity of image contents of the plurality of blocks of the frame is greater than a threshold value, directly using the plurality of first motion vectors as the plurality of final motion vectors of the plurality of blocks of the frame.

5. An image processing circuit, comprising:
a receiving circuit, configured to receive an image signal, wherein the image signal comprises a frame;
a scaling circuit, configured to scale down the frame to generate a scaled-down frame;
a motion estimation circuit, configured to perform a motion estimation operation on a plurality of blocks within the frame to generate a plurality of first motion vectors, respectively, and perform the motion estimation operation on a specific block within the scaled-down frame to generate a second motion vector corresponding to the specific block; and
a motion vector generation circuit, configured to determine a plurality of final motion vectors of the plurality of blocks of the frame according to the plurality of first motion vectors and the second motion vector;
wherein when a complexity of image contents of the plurality of blocks of the frame is lower than a threshold value, the motion vector generation circuit directly uses the second motion vector as the plurality of final motion vectors of the plurality of blocks of the frame, or the motion vector generation circuit performs a weighted summation on the second motion vector and each of the plurality of first motion vectors, to generate the plurality of final motion vectors of the plurality of blocks of the frame.

6. The image processing circuit of claim 5, wherein each of the plurality of blocks has the same size as the specific block, and a relative position of the specific block in the scaled-down frame is the same as a relative position of the plurality of blocks in the frame.

7. The image processing circuit of claim 5, wherein the motion estimation circuit performs the motion estimation operation on the specific block within the scaled-down frame to generate a motion vector, and enlarges the motion vector to generate the second motion vector.

8. The image processing circuit of claim 5, wherein when the complexity of the image contents of the plurality of blocks of the frame is greater than another threshold value, the motion vector generation circuit directly uses the plurality of first motion vectors as the plurality of final motion vectors of the plurality of blocks of the frame.

* * * * *